United States Patent Office 3,254,066
Patented May 31, 1966

3,254,066
CRYSTALLINE POLYACRYLYLLACTAMS
William B. Black, Raleigh, N.C., assignor to Monsanto Company, a corporation of Delaware
No Drawing. Filed Oct. 19, 1964, Ser. No. 404,910
4 Claims. (Cl. 260—88.3)

This application is a continuation-in-part of Serial No. 119,273, and now abandoned.

This invention relates to novel polymers and to processes for their preparation. More particularly this invention relates to novel crystalline homopolymers of certain cyclic acrylimides and to polymerization processes initiated by certain organometallic initiators.

The crystalline homopolymers of this invention are prepared by polymerization of the novel monomers described in copending application Serial No. 119,282, now Patent No. 3,174,955. The monomers are cyclic acrylimides or N-acrylyllactams and are represented by the general formula:

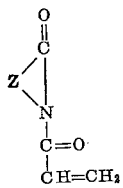

wherein Z represents the radical

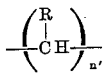

where $n'$ is an integer of from 3 to 6 and R represents a member of the group consisting of H and lower alkyl groups having from 1 to 4 carbon atoms. A method for preparation of these monomers has been fully described in said copending application and it will merely be stated herein that they are derived by the reaction of an acrylyl halide, preferably the chloride, with an alkali metal salt of a lactam having from 3 to 8 members in the ring. Representative of compounds which may be reacted with acrylyl halides to provide the monomers employed in the invention are 3-ethyl-2-pyrrolidone; 3,4-dimethyl-2-pyrrolidone; 3,4,5 - triethyl-2-pyrrolidone; 3 - propyl-2-piperidone; 3,4,5,6 - tetramethyl - 2 - piperidone; 3-methyl-caprolactam; 3,5 - diethyl-caprolactam; 4-butyl-caprolactam; 3-ethyl-enantholactam and the like.

Homopolymers and copolymers of the above described monomers have been prepared through free radical initiated polymerization at ambient temperatures to provide polymers useful for forming fibers and films. The polymers so prepared have an amorphous structure which renders the polymers heat degradable at temperatures of less than about 200° C. as evidenced by a striking change in solubility in formic acid before and after heat treatment.

It has now been discovered that novel crystalline homopolymers having improved properties for the manufacture of fibers and films can be prepared by polymerization of the above described monomers at reduced temperatures in the presence of polymerization initiators included in the general formula:

R'mM wherein R represents a straight or branch chain alkyl radical having from 1 to 6 carbon atoms representative of which are methyl, ethyl, propyl, isopropyl, butyl, hexyl and the like or an aryl radical having 6 to 7 carbon atoms such as phenyl, tolyl, M represents a metal atom of Groups I, II and III of the Mendéleeff Periodic Table of Elements and $m$ is an integer of 1 to 3 which corresponds to the valence of M. Examples of such catalysts are n-butyllithium, triethylaluminum, diethyl zinc, sodium phenyl and the like.

The polymerization according to this invention is desirably carried out in solution under anhydrous condition at temperatures in the range of from about −78° C. to about 0° C. in the presence of from 0.1 to about 10.0 mole percent based on monomer of the above described initiator.

In order to illustrate the invention is greater detail, the following examples of specific polymer preparations are presented. It is to be understood that the examples are given by way of illustration only and are not intended to be limitative. Parts are given by weight unless otherwise indicated.

Example I

An acrylylpyrrolidone monomer, approximately 99 percent pure as shown by gas chromatography, was dried by stirring with sodium hydride for 20 hours at room temperature. The monomer was forced through a filter stick with dry nitrogen into a distillation flask which had beed dried at 90° C. in vacuo. In this manner the monomer was separated by filtration from the sodium hydride and introduced into the distillation flask without contact with air. The monomer was then distilled in vacuo with all distillation equipment employed having been previously dried in vacuo at 90° C. Following completion of the distillation, dry nitrogen was used to break the vacuum. The following fractions were collected:

| Cut No. | Press., mm. | Take Off Temp., ° C. | Ml. |
|---|---|---|---|
| 1 | 0.2 to 0.15 | 71–81 | 10 |
| 2 | 0.15 | 81–83 | 26 |
| 3 | 0.15 | 83 up | 11 |

200 ml. of dimethoxyethane (DME), which had been dried over sodium until a dark green color persisted in the presence of sodium napthalene was distilled into a flame-dried, argon swept, 500 ml. 3-necked flask fitted with a mechanical stirrer and a pressure equalizing dropping funnel. The DME was cooled to −70° C. in a Dry-Ice acetone bath. Then 50 ml. of DME was distilled into the pressure equalizing dropping funnel, and to this from cut No. 2 of the above-noted distillation. To the reaction vessel containing the DME, there was added in one addition 5.2 ml. of an approximately 3.8 molar solution butyl lithium in a hydrocarbon solvent. The DME solution of monomer was then added dropwise to this solution over a period of about 15 minutes. The reaction mixture was stirred for 45 minutes following monomer addition, after which it was poured into a liter of cyclohexane and filtered. The filtered product was washed with several portions of cyclohexane and air dried. The yield was 21 grams, which represented a high conversion to polymer.

The polymer was found to be soluble in 98 percent formic acid at room temperature and in heated pyrrolidone. After melting and heating to about 200° C. the polymer was still soluble in 98 percent formic acid. In contrast with these results polymer derived from the same monomer but polymerized by free radical catalysis was not soluble in formic acid after having been melted and heated about 200° C.

An X-ray diffraction pattern of the polymer powder of the invention showed it was crystalline with the innermost ring being very sharp.

A solution of 5.0 grams of the polymer was then poured into 250 ml. of methanol and the resulting precipitate filtered. The dried polymer weighed 2.0 grams constituting 40 percent of the starting material. An emission specrographic analysis of this precipitated polymer showed complete absence of lithium, sodium and all other metals except for trace amounts of silicon and boron that were in the order of the amounts to be expected from the glass equipment employed. An X-ray diffraction pattern of the precipitated polymer had 5 sharp rings, demonstrative of the fact that the polymer was highly crystalline.

*Example II*

A polymer sample of polyacrylylpyrrolidone was prepared in a manner generally similar to that employed in Example I with the exception that the dimethyl ether of diethylene glycol (diglyme) was used as the solvent rather than dimethoxyethane. This solvent was previously dried in the same manner, i.e., over sodium until a dark green color persisted in the presence of sodium naphthalene.

Twelve grams (10 ml.) of cut No. 3 (see distillation table in Example I) of N-acrylylpyrrolidone dried in a manner as described in Example I was added to 30 ml. of dry diglyme that had been distilled into the pressure equalizing dropping funnel of a 3-necked flask fitted therewith. This mixture was then added dropwise over a period of about 5 minutes to a reaction vessel containing a mixture of 1 ml. of a 3.8 molar solution of butyl lithium (in petroleum ether) and 30 ml. of dry diglyme at $-70°$ C. After one hour 2 ml. more of the butyl lithium solution was added to the reaction all at once. One-half hour later 4 ml. more of the butyl lithium was added. Following another one-half hour of reaction time, the reaction mixture was poured into 250 ml. of cyclohexane. The mixture was then filtered and the precipitate obtained was washed with several portions of cyclohexane. The product was then dried at room temperature in vacuo and a yield of 3.8 grams was obtained.

The polymer in an amount of 3 grams was dissolved in 12 ml. of 98 percent formic acid. This solution was then poured into 150 ml. of methanol to partially precipitate the polymer. After an hour the polymer was filtered and air dried and a fraction weighing 0.6 gram was obtained. An X-ray diffraction pattern of the precipitated polymer showed that it was of the same order of crystallinity as the polymer produced in Example I above.

*Example III*

A sample of polyacrylylpyrrolidone prepared by a polymerization procedure employing a free radical catalysis was re-precipitated from a formic acid solution in the same manner as the polymers produced in accordance with Examples I and II above. This re-precipitated free radical initiated polymer was not crystalline and gave an amorphous X-ray diffraction pattern.

It is believed that the crystalline nature of the polymers of this invention is due to a stereoregular configuration. Because of this crystalline structure the polymers have superior properties of heat stability and resistance to solvents. Thus, the polymers have been found to be particularly useful in the making of fibers and films by melt extrusion where the application of heat below about $200°$ C. does not cause polymer degradation as in the case of amorphous polymers. They may also be adapted for other end-uses to which polymers are often applied such as in coatings, lacquers and plastics.

Various modifications of the invention as described here n will be apparent to those skilled in polymer chemistry. Hence, it will be understood that the invention is not imited to the foregoing description except as it is defined in the appended claims.

I claim:
1. A method for preparing crystalline polymers from a monomer having the formula:

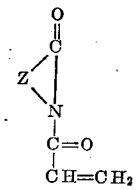

wherein Z represents

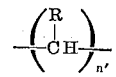

where $n'$ is an integer from 3 to 6 and R represents a member of the group consisting of H and lower alkyl groups of from 1 to 4 carbon atoms, comprising polymerizing said monomer at a temperature in the range of from $-78°$ C. to $0°$ C. in the presence of a catalyst represented by the formula $$R'mM$$

wherein R' is a member selected from the group consisting of lower alkyl and aryl having from 6 to 7 carbon atoms, M is a metal taken from Groups I to III of the Mendéleeff Periodic Table of Elements and $m$ is an integer of from 1 to 3 which corresponds to the valence of M.

2. A method for preparing crystalline polyacrylylpyrrolidone comprising polymerizing N-acrylylpyrrolidone at a temperature in the range from $-78°$ C. to $0°$ C. in the presence of a butyl lithium catalyst.

3. A homopolymer prepared according to the method of claim 1 from a monomeric compound having the formula

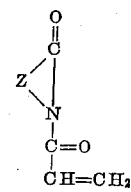

wherein Z represents

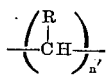

where $n'$ is an integer from 3 to 6 and R represents a member of the group consisting of H and lower alkyl groups of from 1 to 4 carbon atoms said polymer having a crystalline X-ray diffraction pattern.

4. Polyacrylylpyrrolidone having a crystalline X-ray diffraction pattern prepared according to the method of claim 1.

References Cited by the Examiner

UNITED STATES PATENTS 2,728,739  12/1955  Jones _____ 260—88.3
3,103,503   9/1963  Fox et al. _____ 260—89.5

OTHER REFERENCES

Gaylord et al., Linear and Stereoregular Addition Polymers, Interscience Publishers, Inc., N.Y. (1959) (p. 250).

JOSEPH L. SCHOFER, *Primary Examiner.*

JAMES A. SEIDLECK, *Examiner.*

H. WONG, *Assistant Examiner.*